United States Patent Office 3,825,548
Patented July 23, 1974

3,825,548
BIS-p-DITHIINO(2,3-b:2',3'-e)PYRIDINE-
2,3,7,8,10 PENTACARBONITRILE
Norman H. Kurihara, Walnut Creek, and Donald E. Bublitz, Concord, Calif., assignors to The Dow Chemical Company, Midland, Mich.
No Drawing. Original application Jan. 7, 1971, Ser. No. 104,799, now Patent No. 3,761,475, dated Sept. 25, 1973. Divided and this application Feb. 20, 1973, Ser. No. 333,943
Int. Cl. C07d 31/50
U.S. Cl. 260—294.8 B                1 Claim

ABSTRACT OF THE DISCLOSURE

Novel polycyanodithiino aromatic N-heterocyclic compounds are prepared. These are useful as fungicides and bactericides.

CROSS-REFERENCE TO RELATED APPLICATION

This is a division of application Ser. No. 104,799, filed Jan. 7, 1971, now U.S. Pat. No. 3,761,475.

SUMMARY OF THE INVENTION

This invention is directed to polycyanodithiino aromatic N-heterocyclic compounds corresponding to the formula

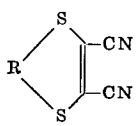

In this and succeeding formulae, R represents
2,3-pyrazinediyl

5,6-dichloro-2,3-pyrazinediyl

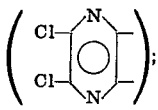

3,6-dichloro-4,5-pyridazinediyl

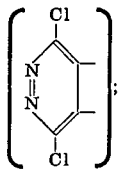

6-chloro-3,4-pyridazinediyl

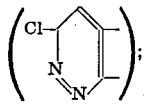

5,6,7,8-tetrachloro-2,3-quinoxalinediyl

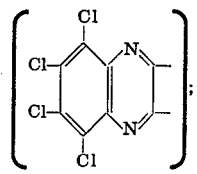

2,3-dicyano[p-dithiino(2,3-b)pyrazine-6,7-diyl]

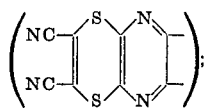

dichloro-cyano-pyridinediyl

2,3,8-tricyano-[p-dithiino(2,3-b)pyridine-6,7-diyl]

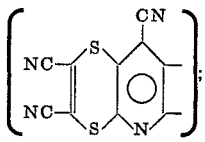

5,6-dicyano-[p-dithiino(2,3-e)-2,1,3-benzothiadiazole-8,9-diyl]

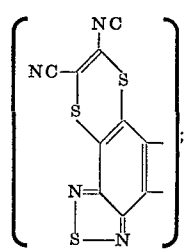

6,7-dibromo-2,1,3-benzothiadiazole-4,5-diyl

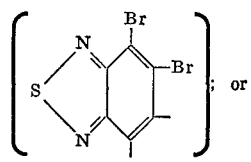

2,1,3-benzothiadiazole-5,6-diyl

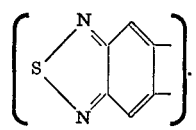

For convenience, the compounds of the present invention are identified as dithiino compounds. The dithiino compounds of the present invention are crystalline solids which are of very low solubility in water and only slightly soluble in common organic solvents such as acetone and benzene.

The new compounds of the present invention are prepared by reacting disodium-cis-1,2-dicyano-1,2-ethylene dithiolate with an appropriate haloaromatic compound. The reaction can be characterized as follows:

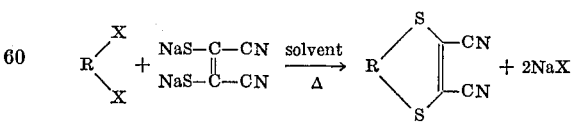

wherein R is as hereinbefore defined and X is chloro or bromo.

In carrying out the reaction, the haloaromatic compound starting material is dissolved in a solvent such as, for example, dimethylformamide, acetone, N-methylpyrrolidone or dimethylacetamide. To this mixture is thereafter added the disodium-cis-1,2-dicyano-1,2-ethylene dithiolate. The reactants are maintained under agitation during the reaction period. The reaction is carried out at temperatures between about 25° and about 100° C. and depending upon the specific reactants and solvent employed, the reaction is usually complete in from about 8 to about 75 hours. Upon completion of the reaction, the reaction mixture is poured into cold water or poured over ice and the crude solid product which precipitates is recovered by filtration or other conventional separatory procedures. The product can then be purified by conventional techniques such as, for example, elution on a silica gel column with a solvent such as chloroform, extraction with a solvent such as chloroform followed by crystallization from a mixture of ethyl acetate and acetone or other well known purification procedures.

DESCRIPTION OF SOME PREFERRED EMBODIMENTS

The following examples illustrate the present invention and the manner by which it can be practiced but, as such, should not be construed as limitations upon the overall scope of the same.

Example I p-Dithiino(2,3-b)pyrazine-2,3-dicarbonitrile

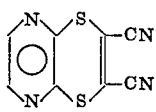

A solution is prepared containing 3.7 grams of disodium-cis-1,2-dicyano-1,2-ethylene dithiolate dissolved in 35 milliliters of dry dimethylformamide and maintained under agitation. To this agitated solution is added a solution containing ~3.0 grams of 2,3-dichloropyrazine in 35 milliliters of dry dimethylformamide. The mixture was maintained overnight (about 14 hours) under agitation at 50° C. and thereafter poured into ice water. The crude solid p-dithiino(2,3-b)pyrazine-2,3-dicarbonitrile product which precipitated was recovered by filtration and dried. The solid product was thereafter eluted with chloroform on a silica gel column. The product was recovered in a yield of 23 percent of theoretical and melted at 163°–165° C. Upon analysis, the product was found to have carbon, hydrogen and nitrogen contents of 43.9, 0.8 and 25.8 percent, respectively, as compared with the theoretical contents of 44.0, 0.9 and 25.6 percent, respectively, calculated for the above-named structure.

Example II 6,7-Dichloro-p-dithiino(2,3-b)pyrazine-2,3-dicarbonitrile

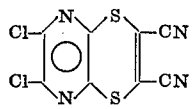

To an agitated solution of 11.7 grams of tetrachloropyrazine dissolved in 50 milliliters of dry dimethylformamide was added a solution of 10.0 grams of disodium-cis-1,2-dicyano-1,2-ethylene dithiolate dissolved in 100 milliliters of dry dimethylformamide. The temperature of the mixture rose to 55° C. and then dropped to room temperature. The mixture was maintained under agitation in a closed vessel for three (3) days (about 72 hours). The reaction mixture was thereafter poured into 1 liter of cold water. The crude 6,7-dichloro-p-dithiino-(2,3-b)pyrazine-2,3-dicarbonitrile product which precipitated was recovered by suction filtration, dried and purified by elution with chloroform on a silica gel column. The product was recovered in a yield of 45 percent of theoretical and melted at 184° C. Upon analysis by mass spectrometry, the product was found to have a molecular weight of 286, based on chlorine having an atomic weight of 35.

Example III 4,5-Dibromo-p-dithiino(2,3-e)(2,1,3)benzothiadiazole-7,8-dicarbonitrile

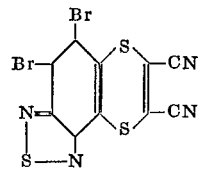

To a solution of 10 grams of tetrabromobenzothiadiazole in 200 milliliters of dry dimethylformamide was added 4 grams of disodium-cis-1,2-dicyano-1,2-ethylene dithiolate. The mixture was maintained under agitation at room temperature for 48 hours and thereafter poured into 800 milliliters of cold water. The solid which precipitates is recovered by filtration, dried and chromatographed on a silica gel column with chloroform as the solvent. The purified solid was found to be a mixture of 0.55 gram of 4,5-dibromo-p-dithiino(2,3-e)(2,1,3)benzothiadiazole which melted at 228° C. with decomposition and 0.65 gram of bis-p-dithiino(2,3-e:2',3'-g)(2,1,3)benzothiadiazol - 5,6,9,10-tetracarbonitrile corresponding to the formula

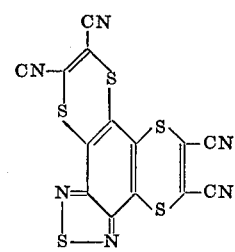

The structure of each compound was confirmed by its mass spectrum.

The following compounds of the present invention are prepared in accordance with methods herein set forth:

6,7,8,9-Tetrachloro-p-dithiino(2,3-b)quinoxaline-2,3-dicarbonitrile

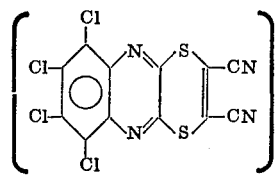

melting at 276°–279° C., with decomposition, prepared by the reaction of 2,3,5,6,7,8-hexachloroquinoxaline and disodium - cis - 1,2 - dicyano - 1,2 - ethylene dithiolate in dimethylformamide.

Bis-p-dithiino(2,3-b:2',3'-e)pyrazine-2,3,7,8-tetracarbonitrile

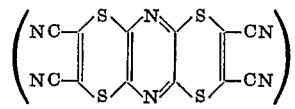

melting at 280° C., with decomposition, prepared by the reaction of tetrachloropyrazine with disodium-cis-1,2-dicyano-1,2-ethylenedithiolate in dimethylformamide.

p-Dithiino(2,3-f)(2,1,3)benzothiadiazole-6,7-dicarbonitrile

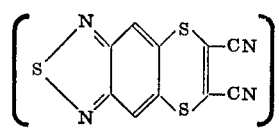

having a molecular weight of 274 and prepared by the reaction of 5,6 - dibromo - 2,1,3-benzothiadiazole and disodium-cis-1,2-dicyano-1,2-ethylenedithiolate.

A mixture of 5,6-dichloro-p-dithiinopyridine-2,3,8-tricarbonitrile, 7,8 - dichloro - p - dithiinopyridine - 2,3,6-tricarbonitrile and 5,8 - dichloro-p-dithiinopyridine-2,3,7-tricarbonitrile having a melting point of 230°–233° C. prepared by the reaction of tetrachloro-2-cyanopyridine and disodium - cis - 1,2 - dicyano-1,2-ethylenedithiolate in dimethylformamide.

6,7 - Dichloro - p - dithiino(2,3-b)pyridine-2,3,8-tricarbonitrile having a melting point of 156°–160° C. prepared by the reaction of tetrachloro-4-cyanopyridine and disodium - cis - 1,2 - dicyano - 1,2-ethylenedithiolate in dimethylformamide at 40° C. for 24 hours.

A mixture of 6,8-dichloro-p-dithiino (2,3-b)pyridine-2,3,7 - tricarbonitrile and 5,7-dichloro-p-dithiino(2,3-c)pyridine - 2,3,8 - tricarbonitrile melting at 160°–200° C. and prepared by the reaction of tetrachloro-3-cyanopyridine and disodium-cis-1,2-dicyano-1,2-ethylenedithiolate in dimethylformamide.

Bis-p-dithiino-(2,3-b:2',3'-e)pyridine-2,3,7,8,10-pentacarbonitrile

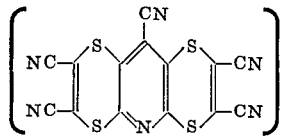

melting at 298°–300° C. and prepared by the reaction of tetrachloro-4-cyanopyridine and disodium - 1,2 - dicyano-1,2-ethylenedithiolate in dimethylformamide at room temperature for 60 hours.

3-Chloro-p-dithiino-(2,3-c)pyridazine-6,7-dicarbonitrile

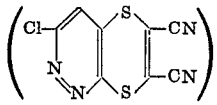

melting at 145° C., with decomposition, and prepared by the reaction of 3,4,6-trichloropyridazine with disodium-cis-1,2-dicyano-1,2-ethylenedithiolate in dimethylformamide.

5,8-Dichloro-p-dithiino(2,3-d)pyridazine-2,3-dicarbonitrile

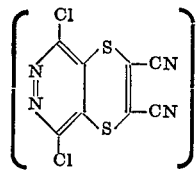

melting at 263°–265° C., with decomposition, and prepared by the reaction of tetrachloropyridazine and disodium - cis-1,2-dicyano-1,2-ethylenedithiolate in dimethylformamide.

In accordance with the present invention, it has been discovered that the dithiino compounds can be employed for the control of many bacterial and fungal organisms. They can be applied to the aerial portions of many growing plants to control leaf-attacking fungal organisms or dispersed in soil or applied to plant seeds to control the root and seed attacking organisms of mold and damping off. In still other operations they can be applied to orchard floor surfaces to control over-wintering spores of many fungal organisms. In still further operations, the compounds of the invention or compositions containing them as toxic constituents can be included in and on plaster, ink, wallboard, textiles, paper, adhesives, soaps, synthetic detergents, cutting oils, polymeric materials, embalming fluids, oil paints and latex paints to prevent the attack of various fungal organisms and the subsequent economic loss due to the degradation of such products by microorganisms. Also, the compounds can be distributed in textiles, cellulosic materials or in grain or can be employed in the impregnation of wood and lumber to preserve and protect such products from the attack of the organisms of rot, mold and decay.

The exact concentration of the toxicant to be employed in the treating compositions is not critical and may vary considerably provided the required dosage of the effective agent is supplied in the ink, adhesive, soap, cutting oil, polymeric material, paint, textile, paper, wood or growth medium or upon plant foliage. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight. For use as a foliar spray or in seed treatment, it is often convenient to apply the compounds as wettable powders.

In a representative operation, each of the compounds 3-chloro-p-dithiino(2,3-c)pyridazine;
6,7-dichloro-p-dithiino(2,3-b)pyrazine-2,3-dicarbonitrile;
bis-p-dithiino(2,3-b:2',3'-e)pyridine-2,3,7,8,10-pentacarbonitrile;
5,8-dichloro-p-dithiino(2,3-d)pyridazine-2,3-dicarbonitrile and
6,7-dichloro-p-dithiino(2,3-b)-pyridine-2,3,8-tricarbonitrile;

when employed as the sole toxicant in an aqueous composition at a concentration of 400 parts by weight per million parts of the ultimate composition, was found to give substantially complete kill and control of the causative organism of downey mildew.

In a further operation, each of (1) 4,5-dibromo-p-dithiino(2,3-e)(2,1,3)benzothiadiazole - 7,8 - dicarbonitrile and (2) a mixture of 6,8-dichloro-p-dithiino-(2,3-b)pyridine - 2,3,7 - tricarbonitrile and 5,7 - dichloro - p-dithiino(2,3-c)pyridine-2,3,8-tricarbonitrile were also found to give substantially complete kill and control of the causative organism of downey mildew when said mixture was employed, as the sole toxicant, in an aqueous composition at a concentration of 400 parts by weight per million parts of the ultimate composition.

In other representative operations, each of the compounds 6,7-dichloro-p-dithiino(2,3-b)pyridine-2,3,8-tricarbonitrile;
p-dithiino(2,3-b)pyrazine-2,3-dicarbonitrile;
bis-p-dithiino(2,3-b:2',3'-e)pyridine-2,3,7,8,10-pentacarbonitrile;
6,7,8,9-tetrachloro-p-dithiino(2,3-b)-quinoxaline-2-3-dicarbonitrile;
bis-p-dithiino(2,3-b:2',3'-e)pyrazine-2,3,7,8 tetracarbonitrile;
bis-p-dithiino-(2,3-e:2',3'-g)(2,1,3)benzothiadiazole-5,6,9,10-tetracarbonitrile;
5,8-dichloro-p-dithiino(2,3-d)pyridazine-2,3-dicarbonitrile;
6,7-p-dithiino(2,3-b)pyrazine-2,3-dicarbonitrile, when employed as the sole toxicant in an aqueous composition at a concentration of 400 parts by weight per million parts of the ultimate composition was found to give substantially complete kill and control of the causative organism of rice blast.

In a similar operation, each of (1) a mixture of 6,8-dichloro-p-dithiino(2,3-b)pyridine - 2,3,7 - tricarbonitrile and 5,7-dichloro-p-dithiino(2,3 - c)pyridine-2,3,8-tricarbonitrile and (2) 4,5 - dibromo - p - dithiino(2,3-e) (2,1,3)-benzothiadiazole - 7,8-dicarbonitrile were also found to give substantially complete kill and control of the causative organism of rice blast, when said mixture was employed as the sole toxicant in an aqueous composition at a concentration of 400 parts by weight per million parts of the ultimate composition.

In another operation, each of the compounds
3-chloro-p-dithiino(2,3-c)pyridazine-6,7-dicarbonitrile;
6,7-dichloro-p-dithiino(2,3-b)pyrazine-2,3-dicarbonitrile;
5,6-dichloro-p-dithiino(2,3-d)pyridazine-2,3-dicarbonitrile and
6,7-dichloro-p-dithiino(2,3-b)pyridine-2,3,8-tricarbonitrile
was found to give substantially complete kill and control of the causative organism of tomato late blight, when said compound was employed as the sole toxicant in an aqueous dispersion at a concentration of 400 parts by weight per million parts of the ultimate dispersion.

In an additional operation, each of the compounds
p-dithiino(2,3-b)pyrazine-2,3-dicarbonitrile;
3-chloro-p-dithiino(2,3-c)pyridazine-6,7-dicarbonitrile;
6,7-dichloro-p-dithiino(2,3-b)pyrazine-2,3-dicarbonitrile;
bis-p-dithiino(2,3-b:2′,3′-e)pyrazine-2,3,7,8-tetracarbonitrile;
6,7-dichloro-p-dithiino(2,3-b)pyridine-2,3,8-tricarbonitrile and
bis-p-dithiino(2,3 - c:2′,3′-g)(2,1,3) - benzothiadiazole-5,6,9,10-tetracarbonitrile, when employed as the sole toxicant in a nutrient agar at a concentration of about 500 parts by weight of the compound per million parts of agar, is found to give 100 percent kill and control of the organisms *Staphylococcus aureus, Trichophyton mentagrophytes, Candida albicans, Bacillus substilis, Pullularia pullulans, Mycobacterium phlei, Aspergillus terreus, Candida pelliculosa, Rhizopus nigricans, Ceratocystis ips* and *Cephaloascus fragans.*

PREPARATION OF STARTING MATERIALS

The disodium-cis-1,2-dicyano-1,2-ethylenedithiolate employed as a starting material in the present invention is a well-known compound and can be prepared by the method taught in Muetterties "Inorganic Synthesis" Volume X, page 11, wherein sodium cyanide is reacted with carbon disulfide and dimethylformamide followed by dimerization of the reaction product.

The chloro N-heterocyclic aromatic compounds employed as starting materials can be prepared by the method taught in U.S. Pat. 3,420,833 wherein the unchlorinated compound is subjected to vapor phase chlorination at temperatures of from about 400° to about 700° C. The chlorinated benzothiadiazole can be prepared by a similar procedure.

The tetrabromobenzothiadiazole employed as a starting material is a known compound and can be prepared by the melt phase bromination of benzothiadiazol.

The 5,6-dibromo-(2,1,3) - benzothiadiazole employed as a starting material is a known compound and can be prepared by the method taught in J. Heterocyclic Chemistry 7, 629 (1970) wherein 4,5-dibromo-o-phenylene diamine is reacted with thionylaniline under reflux conditions in the presence of toluene.

What is claimed is:

1. The compound which is bis-p-dithiino(2,3-b:2′,3′-e)pyridine-2,3,7,8,10 - pentacarbonitrile corresponding to the formula

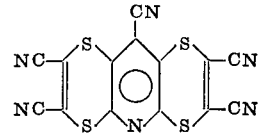

References Cited
UNITED STATES PATENTS 3,053,853    9/1962    Vest _____ 260—250 R ALAN L. ROTMAN, Primary Examiner U.S. Cl. X.R.

260—294.8 C, 304, 250 R, 250 A, 294.9; 71—90; 424—250, 2